(12) United States Patent
Goedecke et al.

(10) Patent No.: US 10,773,193 B2
(45) Date of Patent: Sep. 15, 2020

(54) FILTER ELEMENT HAVING PROJECTING BAYONET-TYPE PROTRUSION

(71) Applicant: MANN+HUMMEL GMBH, Ludwigsburg OT (DE)

(72) Inventors: Marco Goedecke, Vaihingen (DE); Holger Beyerlin, Friolzheim (DE); Gunther Kraft, Ludwigsburg (DE); Andreas Wildermuth, Marbach (DE); Frank Pflueger, Sachsenheim (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 272 days.

(21) Appl. No.: 15/598,147

(22) Filed: May 17, 2017

(65) Prior Publication Data

US 2017/0252684 A1 Sep. 7, 2017

Related U.S. Application Data

(63) Continuation of application No. PCT/EP2015/076611, filed on Nov. 13, 2015.

(30) Foreign Application Priority Data

Nov. 20, 2014 (DE) .......................... 10 2014 017 121

(51) Int. Cl.
*B01D 36/00* (2006.01)
*B01D 35/18* (2006.01)
(Continued)

(52) U.S. Cl.
CPC ........... *B01D 36/005* (2013.01); *B01D 29/13* (2013.01); *B01D 29/21* (2013.01); *B01D 29/58* (2013.01);
(Continued)

(58) Field of Classification Search
CPC ...... B01D 36/005; B01D 29/13; B01D 35/18; B01D 29/58; B01D 29/21; B01D 36/006;
(Continued)

(56) References Cited

U.S. PATENT DOCUMENTS 5,571,412 A * 11/1996 Nerli .................... B01D 29/012
210/232
6,187,191 B1 * 2/2001 Koivula ................. B01D 29/21
210/440

(Continued)

FOREIGN PATENT DOCUMENTS

| DE | 102007057380 A1 | 6/2008 | |
|---|---|---|---|
| DE | 102012005206 A1 * | 9/2013 | ............. B01D 35/18 |
| WO | 2011107262 A1 | 9/2011 | |
| WO | 2013083309 A1 | 6/2013 | |

*Primary Examiner* — David C Mellon
(74) *Attorney, Agent, or Firm* — James Hasselbeck

(57) ABSTRACT

A filter element is provided with a filter medium and a first end disk connected to the filter medium. A first bayonet protrusion is disposed on the first end disk and designed to engage behind a first bayonet receptacle of a filter housing of a filter. The first bayonet protrusion has a free end. The first bayonet protrusion projects at least over sections thereof in a radial direction relative to a filter element longitudinal axis of the filter element past the filter medium. The free end projects in the radial direction toward the filter element longitudinal axis. A filter with a filter housing provided with a first bayonet receptacle is provided and the filter element is arranged in the filter housing such that the first bayonet protrusion on the first end disk engages behind the first bayonet receptacle of the filter housing.

9 Claims, 6 Drawing Sheets

(51) Int. Cl.
*B01D 29/21* (2006.01)
*B01D 29/58* (2006.01)
*B01D 29/13* (2006.01)
*F02M 37/24* (2019.01)
*G01F 23/22* (2006.01)

(52) U.S. Cl.
CPC ......... *B01D 35/18* (2013.01); *B01D 36/006* (2013.01); *B01D 2201/24* (2013.01); *B01D 2201/291* (2013.01); *B01D 2201/347* (2013.01); *B01D 2201/4015* (2013.01); *F02M 37/24* (2019.01); *G01F 23/22* (2013.01)

(58) Field of Classification Search
CPC ...... B01D 2201/347; B01D 2201/4015; B01D 2201/24; B01D 2201/291; B01D 35/005; B01D 35/16; B01D 35/30; B01D 35/306; B01D 2201/4046; B01D 2201/4053; B01D 2201/4061; B01D 2201/40; F02M 37/24; F02M 37/22; F02M 37/26; F02M 37/28; F02M 37/30; F02M 37/32; F02M 37/42; G01F 23/22
See application file for complete search history.

(56) References Cited

U.S. PATENT DOCUMENTS

| | | | | |
|---|---|---|---|---|
| 7,572,306 | B2* | 8/2009 | Hawkins | B01D 29/21 55/310 |
| 8,268,170 | B2* | 9/2012 | Core | B01D 29/21 210/232 |
| 8,349,180 | B2* | 1/2013 | Milum | B01D 29/21 210/232 |
| 2001/0037969 | A1* | 11/2001 | Stankowski | B01D 35/30 210/348 |
| 2004/0232064 | A1* | 11/2004 | Wilkinson | B01D 29/15 210/435 |
| 2005/0000886 | A1* | 1/2005 | Reynolds | B01D 29/21 210/450 |
| 2006/0186031 | A1* | 8/2006 | Fick | B01D 29/118 210/235 |
| 2007/0267338 | A1* | 11/2007 | Menez | B01D 29/21 210/435 |
| 2008/0245719 | A1 | 10/2008 | Beard | |
| 2009/0301950 | A1 | 12/2009 | Weindorf | |
| 2015/0021246 | A1* | 1/2015 | Sturgess | B01D 35/18 210/104 |

* cited by examiner

FILTER ELEMENT HAVING PROJECTING BAYONET-TYPE PROTRUSION

CROSS-REFERENCE TO RELATED APPLICATIONS

This application is a continuation application of international application No. PCT/EP2015/076611 having an international filing date of 13 Nov. 2015 and designating the United States, the international application claiming a priority date of 20 Nov. 2014, based on prior filed German patent application No. 10 2014 017 121.3, the entire contents of the aforesaid international application and the aforesaid German patent application being incorporated herein by reference.

BACKGROUND OF THE INVENTION

The invention concerns a filter element with a filter medium and a first end disk as well as a filter with such a filter element.

US 2014/0027361 A1 discloses a water filter. The water filter comprises a filter medium that is connected to an end disk. On the end disk, bayonet protrusions are formed whose free ends extend inwardly in radial direction.

US 2003/0141235 A1 discloses a filter element with locking projections that are projecting outwardly in radial direction.

Furthermore, DE 20 2007 017 614 U1 discloses an oil filter. The oil filter comprises a filter element with bayonet protrusions oriented outwardly in radial direction.

Moreover, US 2007/0158263 A1 discloses a filter element with a circumferentially extending locking projection that is inwardly oriented in radial direction.

Finally, U.S. D497,972 S and U.S. Pat. No. 5,154,823 A disclose filter elements with locking hooks for connecting the filter elements to a filter housing.

SUMMARY OF THE INVENTION

In contrast to this, the invention has the object to provide a filter element that can be installed in a filter housing by means of a compact but stably embodied bayonet connection.

The object according to the invention is thus solved by a filter element for a filter, wherein the filter element comprises a filter medium and a first end disk connected to the filter medium, wherein on the first end disk a first bayonet protrusion for engagement behind a first bayonet receptacle of a filter housing of the filter is arranged or formed, and wherein the first bayonet protrusion, relative to the filter element longitudinal axis, projects at least over sections thereof radially past the filter medium and projects with its free end radially toward the filter element longitudinal axis.

The dependent claims provide expedient further embodiments of the invention.

Due to the first bayonet protrusion which is projecting past the filter medium and whose free end is pointing inwardly in radial direction, space for the first bayonet receptacle is provided in the area of the first end disk. The filter element is therefore compact as well as installable in a space-saving way on the filter housing. The inwardly oriented free end of the first bayonet protrusion prevents moreover sharp outwardly oriented edges on the first bayonet protrusion so that the risk of injury is reduced when exchanging the filter element.

Preferably, the first bayonet protrusion projects not only over sections thereof past the filter medium relative to the filter element longitudinal axis, but additionally also at least over sections thereof past the first end disk in radial direction. In this way, despite the bayonet connection, there is space for further elements between the first end disk of the filter element and the filter housing. In this space, a heating element can be installed, for example.

Further preferred, the filter element comprises a stop edge which is extending parallel to the filter element longitudinal axis in order to provide a stop when installing the filter element in the filter housing.

The first bayonet protrusion is preferably formed together with the first end disk as one piece.

The manufacture of the filter element is simplified when it is designed to be of axial symmetry relative to its filter element longitudinal axis.

On the first end disk, a second bayonet protrusion for engagement behind a second bayonet receptacle of the filter housing can be arranged or formed, wherein the second bayonet protrusion in relation to the filter element longitudinal axis is formed to be of axial symmetry relative to the first bayonet protrusion.

The second bayonet protrusion is preferably formed together with the first end disk as one piece.

Moreover, the filter element may comprise a second end disk wherein the filter medium is arranged between the first end disk and the second end disk and wherein on the second end disk a stay is arranged or formed which is extending at least over sections thereof parallel to the filter element longitudinal axis. The stay serves as a mounting aid in order to be able to grip and turn the filter element and to thus release the bayonet connection between filter element and filter housing. At the same time, the stay can serve as a support of the filter element in the filter housing.

In a particularly preferred embodiment of the invention, the filter element is in the form of a fuel filter, in particular of a water-separating fuel filter. A quick water discharge from the filter element is achieved in this context when the filter element comprises a water drainage opening, in particular a sedimentation gap.

In a further preferred embodiment of the invention, the filter element comprises a final separator screen and/or a coalescing medium between filter medium and final separator screen. This enables a particularly high water separation rate of the filter element.

The invention further concerns a filter comprising a filter housing and a filter element as described above that is arranged in the filter housing, wherein the first bayonet protrusion engages a first bayonet receptacle of the filter housing. The filter housing comprises preferably a filter housing body and a cover that is connected by a thread connection to the filter housing body.

The filter in this context is preferably embodied such that the bayonet protrusion engages the bayonet receptacle when the cover is unscrewed from the filter housing body.

The filter element can be arranged upright in the filter housing. In this case, the bayonet receptacle is provided in the cover. When the cover is screwed on, the filter element is detached from the cover. When the cover is unscrewed, the filter element is connected to the cover. When exchanging the filter element, the filter element is thus removable from the filter housing body together with the cover.

Alternatively, the first bayonet receptacle can be arranged or formed in the filter housing body, wherein the filter element can be arranged suspended in the filter housing by means of the bayonet receptacle. The first end disk is then the top end disk in the operating state of the filter element, the second end disk the bottom end disk of the filter element in the operating state. The filter housing body is in particular fixedly connected to a supply line of a medium to be filtered and to a discharge line of the filtered medium.

When the cover is unscrewed, the filter element is preferably connected with the filter housing body. When the cover is screwed on, the filter element is preferably detached from the filter housing body. Vibrations during operation of the filter are thus not transmitted from the filter housing body onto the filter element. A suspended installation of the filter element has moreover the advantage that, upon separation of the cover from the filter housing body, liquid contained in the cover is retained therein and cannot mix with other liquids or escape into the environment.

The cover comprises preferably in radial direction a reduced inner width than the filter housing body. Moreover, the bayonet protrusion projects preferably in radial direction so far past the filter medium that the filter element, with the bayonet protrusion leading, can be inserted into the filter housing body but not into the cover. In this way, an installation guard is realized that prevents that the filter element in case of a filter element exchange is inserted "backward's" into the filter housing body.

The filter can have a central column which is extending at least partially in the direction of the filter element longitudinal axis, wherein the first bayonet receptacle is arranged or formed on the central column. The central column extends in this context at least partially along the filter element longitudinal axis. The central column provides for a particularly compact and stable configuration of the filter.

Preferably, on the central column a second bayonet receptacle is arranged or formed in order to receive a second bayonet protrusion of the filter element.

Particularly preferred, the central column is connected fixedly with the filter housing, in particular welded thereto. In this way, the central column serves not only for providing the bayonet receptacle(s) but also as an insertion aid when exchanging the filter element.

Further preferred, a heating element of the filter is arranged on the central column. The heating element in this context is preferably fixedly connected with the central column.

On the central column, a water level electrode can be arranged. The central column is therefore additionally usable as a water level detector.

The afore described stay of the filter element is supported preferably on a projection of the filter housing.

The filter element has further preferred an internal sealing element for separation of a raw side of the filter from a water collecting chamber of the filter wherein the internal sealing element is arranged in the area of the second end disk.

Preferably, the internal sealing element is in the form of a radial sealing element, in particular in the form of an O-ring. This enables a constructively particularly simple configuration of the filter element.

Particularly preferred, the internal sealing element is arranged on the second end disk so as to be facing in radial direction outwardly.

The seal-tightness of the internal sealing element is particularly high when the internal sealing element is arranged in an internal sealing element groove whose opening is facing away from the filter element longitudinal axis in radial direction. Due to the internal sealing element groove which is facing away from the filter element longitudinal axis, the internal sealing element is resting against an inner side of the filter housing in operation of the filter.

Bayonet protrusion and bayonet receptacle form a bayonet connection. In the bayonet connection, bayonet protrusion and bayonet receptacle are frictionally connected to each other. The friction coefficient of this frictional connection is smaller than the friction coefficient between the internal sealing element and a wall section of the filter housing against which the internal sealing element is resting. In other words, the friction between internal sealing element and filter housing is greater than the friction between bayonet protrusion and bayonet receptacle. In this way, the bayonet protrusion engages the bayonet receptacle when the cover is unscrewed from the filter housing and opens the bayonet connection when the cover is screwed onto the filter housing.

In a particularly preferred embodiment of the invention, the filter housing has an external sealing element between cover and filter housing body. The connection between filter housing body and cover is sealed by the external sealing element relative to the environment in order to reliably prevent escape of medium to be filtered from the raw side of the filter into the environment.

The external sealing element can be embodied in the form of a radial sealing element, in particular in the form of an O-ring, wherein the external sealing element is arranged in an external sealing element groove. In this way, a high seal-tightness of the raw side of the filter relative to the environment is achieved.

Preferably, the external sealing element is arranged in the cover. The external sealing element is then easily accessible and exchangeable in case of wear.

In a further embodiment of the invention, the external sealing element and the internal sealing element are arranged on the filter such that, upon unscrewing the cover, first the sealing action of the internal sealing element and subsequently the sealing action of the external sealing element are canceled. In other words, upon demounting the cover, the external sealing element has a sealing seat parallel to the filter element longitudinal axis for a longer period of time than the internal sealing element. In this way, when unscrewing the cover, medium from the raw side is discharged via the canceled sealing action of the internal sealing element and only thereafter the connection of the filter housing body relative to the environment is produced by means of the canceled sealing action of the external sealing element. This measure prevents reliably escape of medium to be filtered from the raw side of the filter into the environment. The described measure is particularly advantageous in case of a suspended installation of the filter element because in this case the medium to be filtered is discharged into the cover and collected therein when the cover is unscrewed.

The filter housing, in particular the cover of the filter housing, comprises preferably a reversible openable and closable drainage device for discharging separated water. For discharging the water separated from the filtered medium, it is thus not required to unscrew the cover from the filter housing body; this further reduces the risk of a contamination of the environment with medium or the risk of mixing of liquids between raw side and water collecting chamber in the filter.

Upon servicing, the separated water and filtered medium can thus be discharged through the drainage device. Subsequently, the drainage device can be closed and the cover can be unscrewed so that the unfiltered medium can flow into the cover and can be removed. Subsequently, the filter element can be exchanged. In summary, prior to the filter element exchange, water (together with already purified medium) can be drained from the filter separate from the raw-side medium.

The filter is constructively of a particularly simple design and therefore can be produced inexpensively when the drainage device is embodied in the form of a plug.

BRIEF DESCRIPTION OF THE DRAWINGS

Further features and advantages of the invention result from the following detailed description of an embodiment of the invention, with the aid of the figures of the drawing illustrating details important to the invention, as well as from the claims.

The features illustrated in the drawing are illustrated such that the inventive particularities are clearly visible. The different features can be realized each individually or several combined in any combinations in variants of the invention.

DESCRIPTION OF PREFERRED EMBODIMENTS

Figure 1:
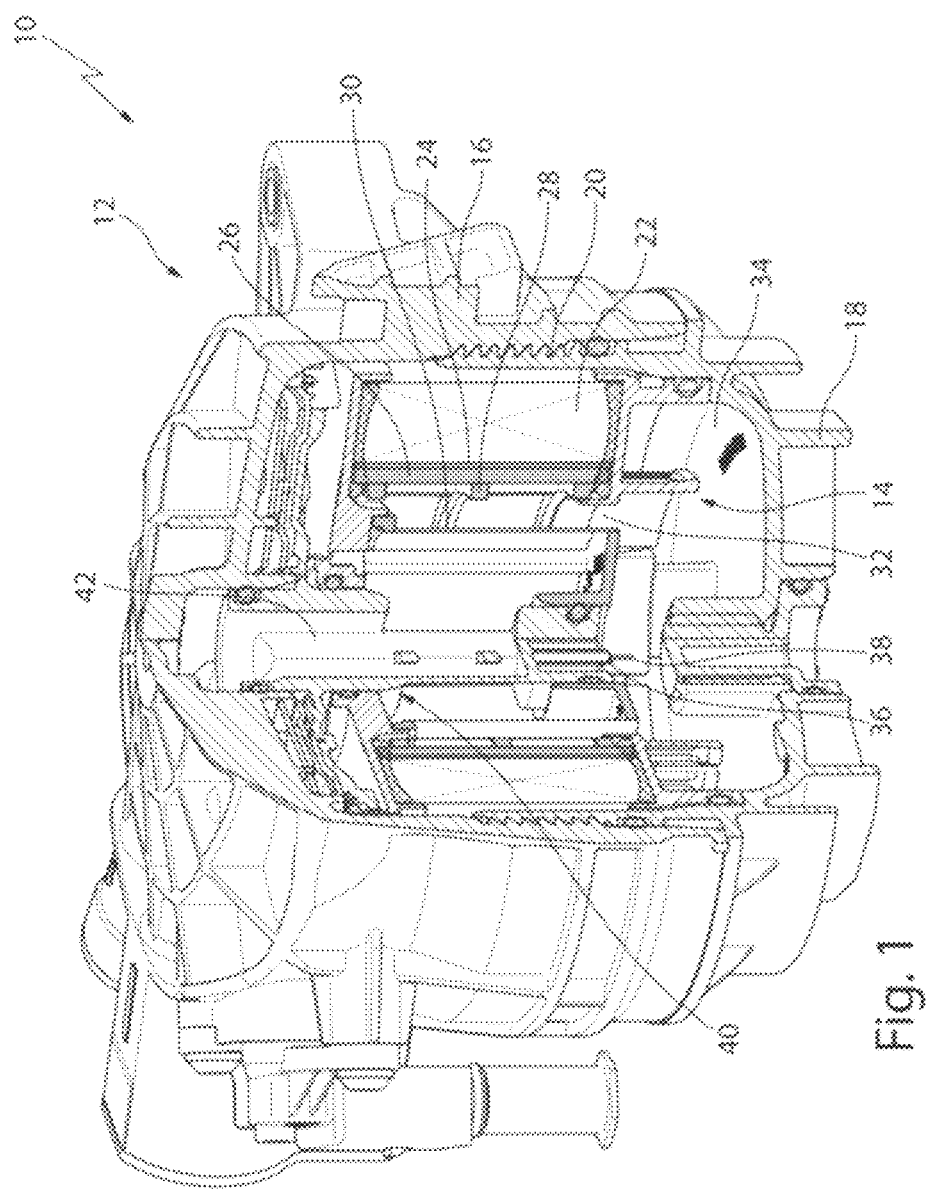
FIG. 1 shows a perspective partially sectioned view of a filter in the form of a fuel filter with a filter element.

FIG. 1 shows a filter 10 in the form of a fuel filter, here a diesel filter, for filtering media in the form of fuel, here in the form of diesel, comprising a filter housing 12 and a filter element 14 installed in the filter housing 12. The filter housing 12 comprises a filter housing body 16 and a cover 18. The cover 18 is screwed by a thread 20 onto the filter housing body 16. For exchange of the filter element 14, the cover 18 is unscrewed from the filter housing body 16.

The filter element 14 is designed to filter out dirt and separate water in multiple stages in order to fulfill high requirements in regard to the purity and waterlessness of the filtered fuel. The filter element 14 comprises for this purpose a filter medium 22. The filter medium 22 is folded several times to a star shape in order to provide a great surface area. Following the flow of the fuel, the filter element 14 comprises a first coalescing medium 24 adjoining the filter medium 22 that is in the form of a nonwoven.

Water droplets form on the first coalescing medium 24. Downstream of the first coalescing medium 24, a coarser second coalescing medium 26 for enlarging the water droplets is provided. The second coalescing medium 26 is contacting inwardly a support body 28. Between the support body 28 and a final separator screen 30, a sedimentation gap 32 is formed. The final separator screen 30 functions as a "baffle plate" for separating the water droplets which, following the force of gravity, flow via the sedimentation gap 32 into a water collecting chamber 34 in the cover 18 of the filter housing 12.

In the filter housing 12, water level electrodes 36, 38 are provided that are spaced apart relative to each other in order to detect when the maximum filling level of the water in the water collecting chamber 34 is reached. The water level electrodes 36, 38 are arranged in a central column 40. The central column 40 comprises a fuel drain 42.

Figure 2:
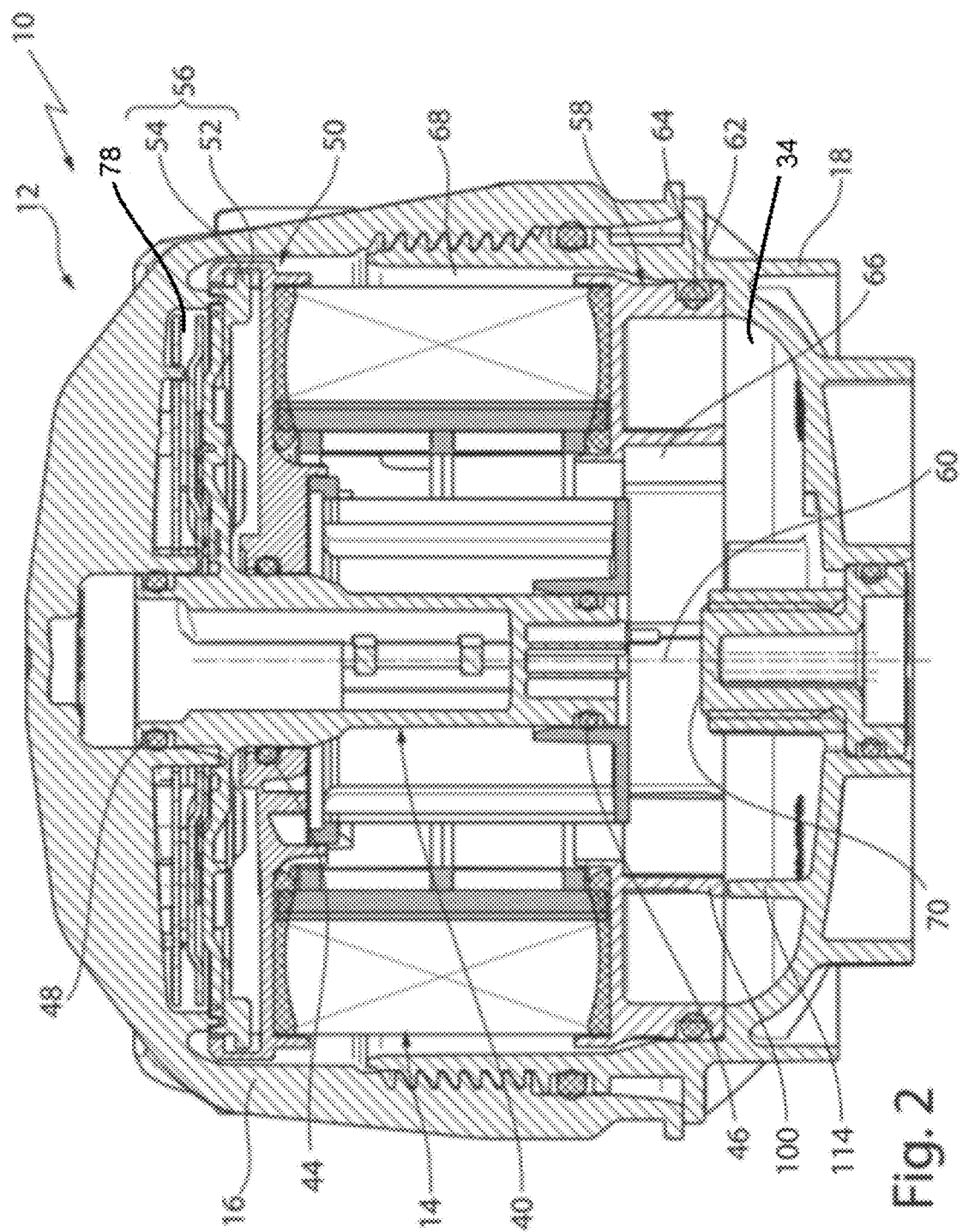
FIG. 2 is a sectioned side view of the fuel filter of FIG. 1.

FIG. 2 shows the fuel filter 10 in a sectioned side view. FIG. 2 shows that the central column 40 is reversibly detachably connected to the filter element 14. The central column 40 is coupled in this context by sealing rings 44, 46 to the filter element 14. Moreover, the central column 40 is reversibly detachably connected to the filter housing body 16. The central column 40 is coupled by a sealing ring 48 to the filter housing body 16. The sealing rings 44, 46, 48 are formed as radial sealing rings, respectively.

The filter element 14 is installed suspended from the filter housing body 16. For connecting the filter element 14 to the filter housing body 16, a bayonet protrusion 52 having a U-shaped cross section projects radially outwardly from a radially outer circumference of a first end disk 50 of the filter element 14 and projects axially outwardly away from an axially outer surface of the the first end disk 50. The bayonet protrusion 52 having a free end 94 forming an axially outermost leg of the "U" shaped cross section of the bayonet protrusion 52, the free end projecting radially inwardly. The "U" shaped cross section of the bayonet protrusion 52 opens radially inwardly for engaging a bayonet receptacle 54 of the filter housing body 16. The bayonet protrusion 52 and the bayonet receptacle 54 form a part of a bayonet connection 56.

In FIG. 2, the cover 18 is completely screwed onto the filter housing body 16 or partially screwed into the latter. In this state, the bayonet connection 56 is open, i.e., the filter element 14 is vibration decoupled from the filter housing body 16.

The filter element 14 comprises a second end disk 58. The second end disk 58 is arranged opposite the first end disk 50 in direction of the filter element longitudinal axis 60. The second end disk 58 comprises an internal sealing element groove 62 whose opening is facing away from the filter element longitudinal axis 60 in radial direction. An internal sealing element 64 is arranged in the internal sealing element groove 62. The internal sealing element 64 is in the form of a radial sealing element, more precisely, in the form of an O-ring. The internal sealing element 64 separates a clean side 66 from a raw side 68 of the fuel filter 10. The internal sealing element 64 prevents fuel from passing from the raw side 68 to the clean side 66 or into the water collecting chamber 34.

The fuel filter 10 comprises a drainage device 70 in the form of a plug. Through the drainage device 70, separated water (together with purified fuel) can be drained. After drainage of the water, the drainage device 70 can be closed in order to subsequently drain—separate from water and purified fuel—unpurified fuel by unscrewing the cover 18 and exchange the filter element 14.

The internal sealing element 64 contacts with frictional connection a wall section of the cover 18. The sealing action between the internal sealing element 64 and the wall section of the cover 18 that is resting against the internal sealing element 64 has in this context a greater friction coefficient than the bayonet connection 56. When unscrewing the cover 18, the filter element 14 is thus turned together with the cover 18. In doing so, the bayonet connection 56 closes. When the bayonet connection 56 is closed, the bayonet connection 56 blocks a further rotation of the filter element 14 relative to the filter housing body 16. Upon further rotation of the cover 18 (unscrewing the cover 18), a rotation of the cover 18 relative to the filter element 14 occurs instead. The cover 18 is thus unscrewed from the filter housing body 16 while the filter element 14 stays connected to the filter housing body 16.

Figure 3:
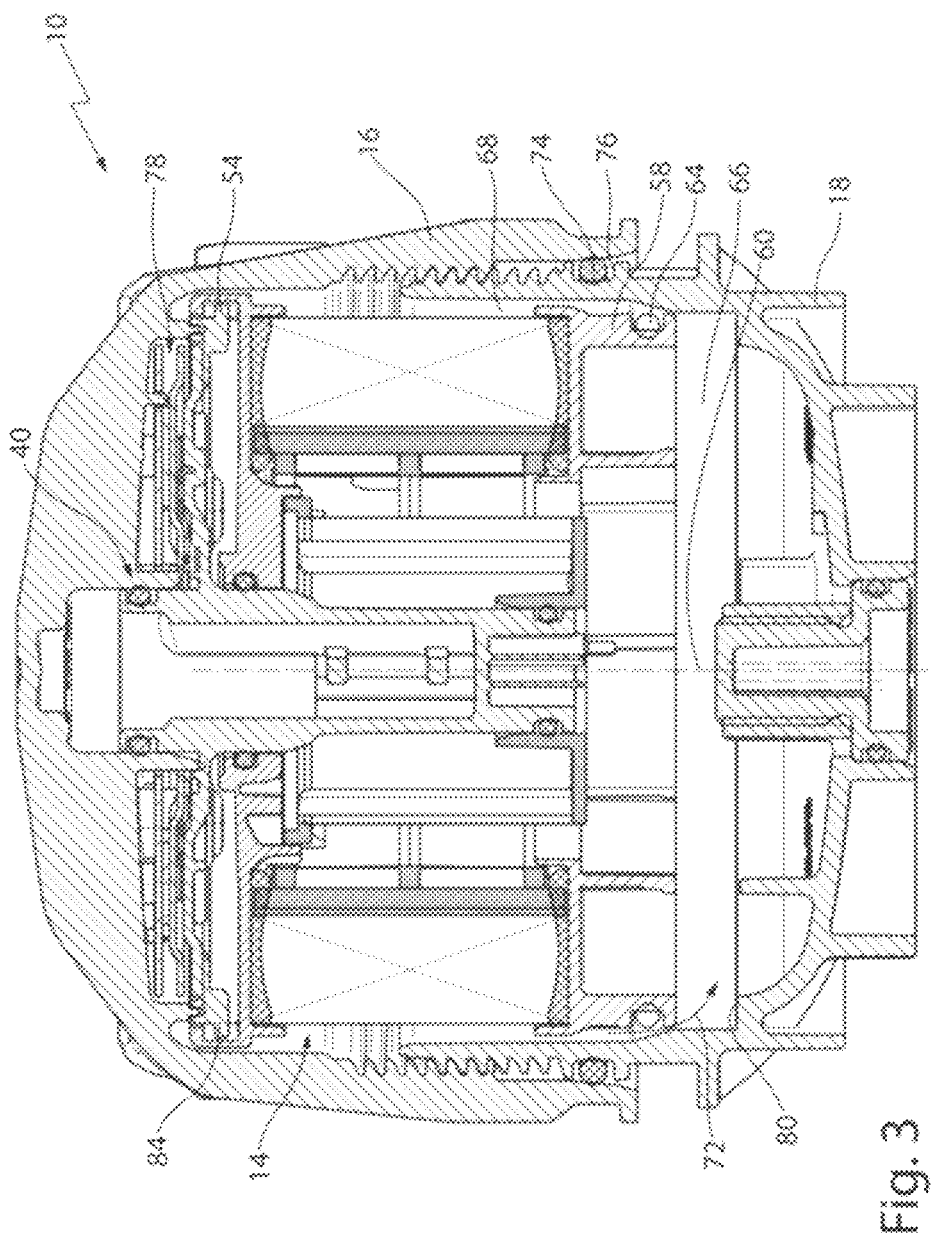
FIG. 3 is a sectioned side view of the fuel filter according to FIG. 2 with partially unscrewed cover.

FIG. 3 shows the fuel filter 10 with cover 18 partially unscrewed with the annular support wall 80 of the cover 18 backed away from a bottom wall of the second end plate 58. The internal sealing element 64 is disengaged from the cover 18. In this way, unpurified fuel from the raw side 68 can drain in the direction of arrow 72 into the cover 18. The unpurified fuel can thus be collected separate from water and purified fuel in the cover 18 prior to filter element exchange. The escape of fuel into the environment is prevented in this context by an external sealing element 74. The seal between cover 18 and filter housing body 16 by means of the external sealing element 74 is still closed when the sealing action between filter element 14 and cover 18 by the internal sealing element 64 is already canceled. In this way, the exclusive fuel drainage into the cover 18 when unscrewing the cover 18 is reliably ensured.

The external sealing element 74 is designed in the form of a radial sealing element, here in the form of an O-ring. The external sealing element 74 is arranged in an external sealing element groove 76.

For heating the fuel, in particular for filtering the diesel fuel, a heating element 78 is provided in the fuel filter 10. The heating element 78 is arranged on the central column 40. The central column 40 is connected fixedly with the filter housing body 16. The first bayonet receptacle 54 and a second bayonet receptacle 84 are formed on the central column 40.

Figure 4:
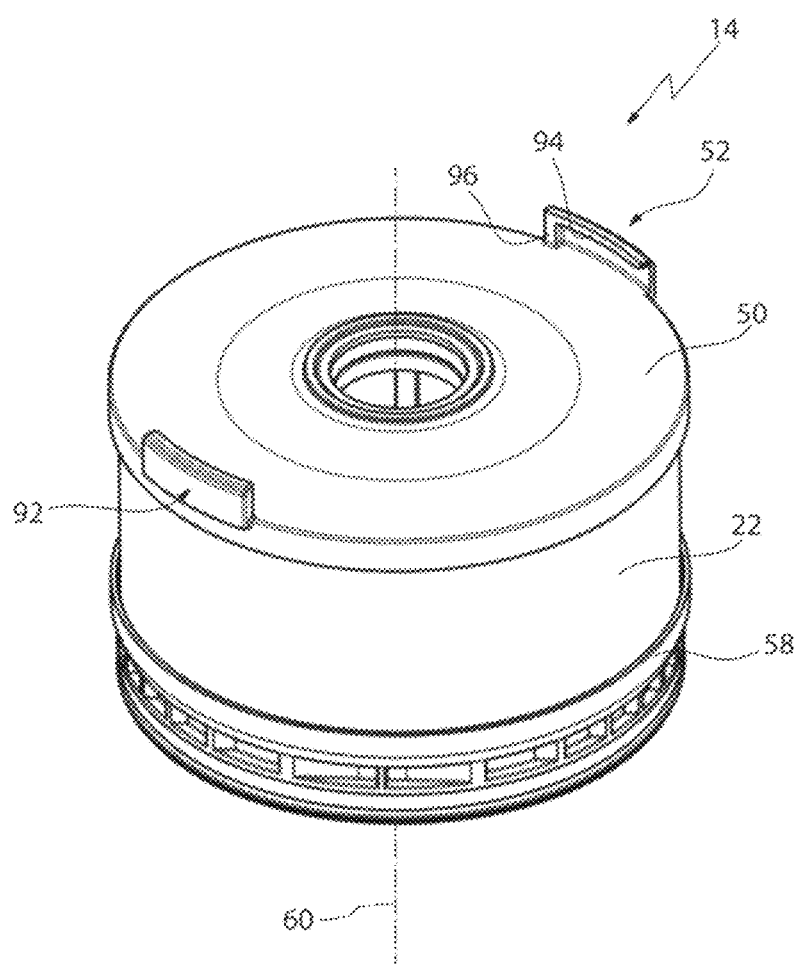
FIG. 4 is a perspective view of the filter element from above.

FIG. 4 shows the filter element 14 in an individual illustration. The filter element 14 comprises the first end disk 50 and the second end disk 58. The filter medium 22 is arranged between the end disks 50, 58. On the first end disk 50, the first bayonet protrusion 52 and a second bayonet protrusion 92 are formed. The bayonet protrusions 52, 92 project in relation to the filter element longitudinal axis 60 in radial direction completely past the filter medium 22 as well as partially past the first end disk 50. The bayonet protrusions 52, 92 are designed with axial symmetry relative to the filter element longitudinal axis 60. The example of the first bayonet protrusion 52 illustrates that the bayonet protrusions 52, 92 have a free end 94 which is projecting radially toward the filter element longitudinal axis 60. In this way, sharp, free outwardly projecting edges at the bayonet protrusions 52, 92 are avoided and a large mounting space above the first end disk 50 for arranging the heating element 78 is provided. The bayonet protrusions 52, 92 have moreover a stop edge 96.

Figure 5:
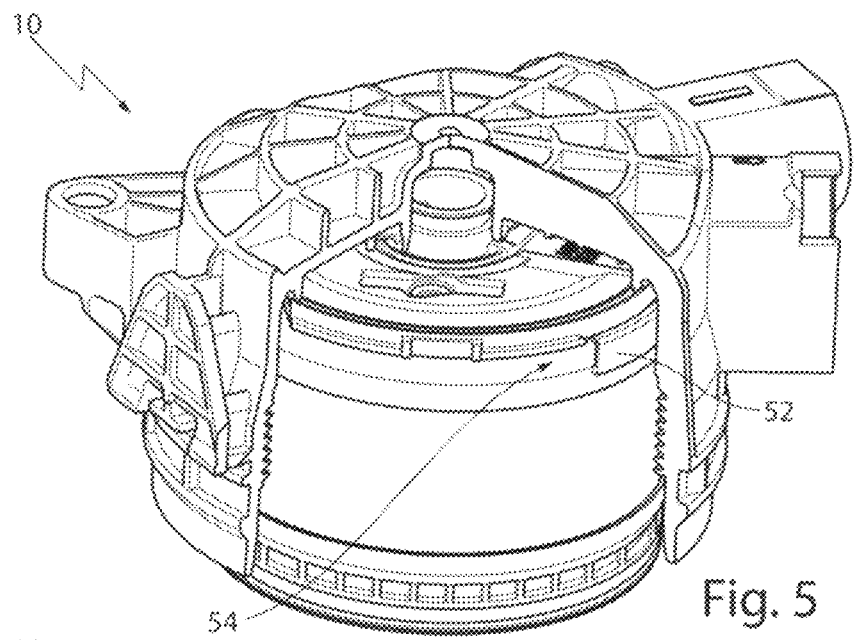
FIG. 5 is a perspective view of the filter in operating state.

FIG. 5 shows the filter 10 (without cover) in the operating state. In the operating state, the bayonet protrusions—of which in FIG. 5 the first bayonet protrusion 52 is visible—are disengaged from the bayonet receptacles—of which in FIG. 5 the first bayonet receptacle 54 is visible.

Figure 6:
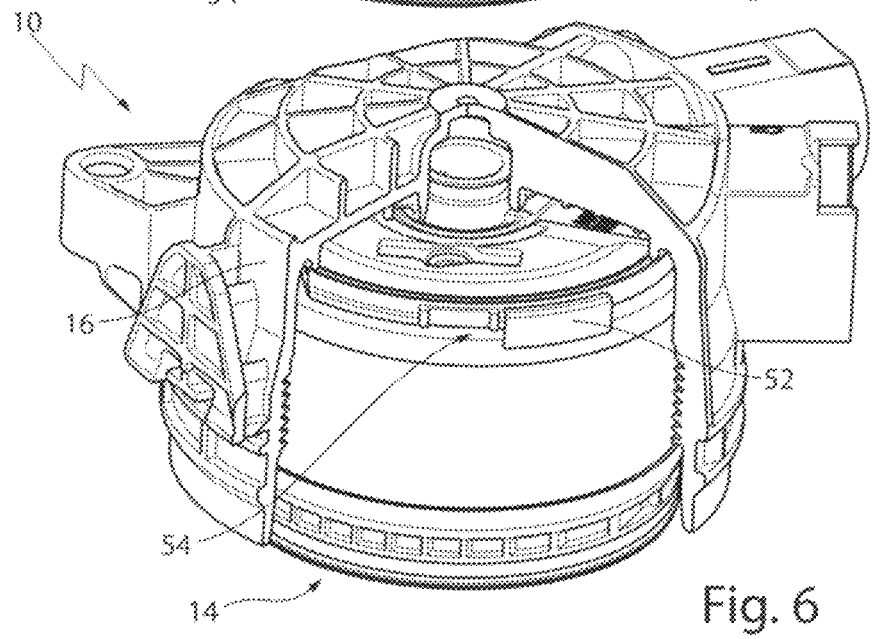
FIG. 6 is a perspective view of the filter according to FIG. 5 when demounting the filter element.

FIG. 6 shows in contrast thereto the filter 10 (without cover) during demounting. By rotation of the cover 18 (see FIGS. 2 and 3), the bayonet protrusions—of which in FIG. 6 the first bayonet protrusion 52 is visible—are in engagement with the bayonet receptacles—of which in FIG. 6 the first bayonet receptacle 54 is visible. When exchanging the filter element, the filter element 14 is thus suspended from the filter housing body 16 after unscrewing the cover 18.

Figure 7:
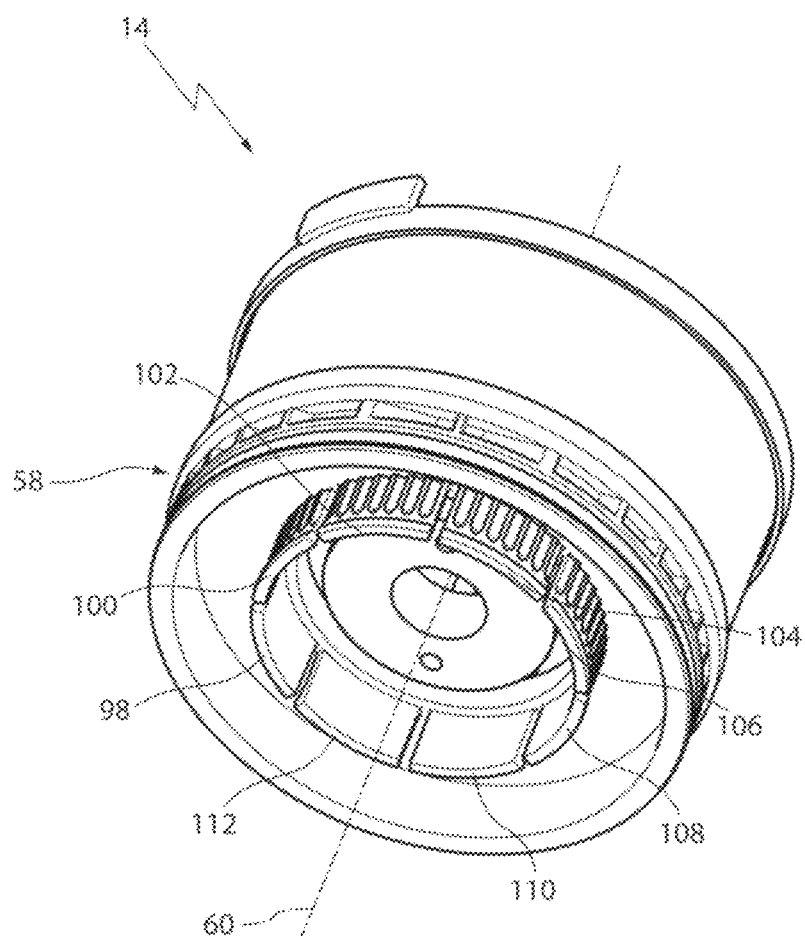
FIG. 7 shows a perspective view of the filter element from below.

FIG. 7 shows the filter element 14 in a view from below. The filter element 14 comprises at its second end disk 58 several stays 98, 100, 102, 104, 106, 108, 110, 112. The stays 98, 100, 102, 104, 106, 108, 110, 112 serve as a turning handle for the filter element 14. Moreover, the stays 98, 100, 102, 104, 106, 108, 110, 112 serve in the mounted state of the filter element 14 as a support relative to the cover 18, as can be seen in FIG. 2 which shows in an exemplary fashion the support of the stay 100 on a projection 114 of the cover 18. The stays 98, 100, 102, 104, 106, 108, 110, 112 are of axial symmetry relative to the filter element longitudinal axis 60.

In summary, the invention concerns a filter element comprising a filter medium. The filter element is connectable by means of at least one bayonet protrusion of the filter element to a filter housing of a filter. The bayonet protrusion projects in radial direction, i.e., perpendicularly to the central longitudinal axis of the filter element, past the filter medium. Moreover, the free end of the bayonet protrusion faces in the direction toward the central filter element longitudinal axis. The configuration according to the invention of the bayonet protrusion provides a large free mounting space in the area of the bayonet protrusion and avoids injuries because the free end of the bayonet protrusion projects in radial direction inwardly.

What is claimed is:

1. A filter element comprising:
a filter medium;
a first end disk connected to an axial end of the filter medium, the first end disk having a plurality of bayonet protrusions, each bayonet protrusion having a U-shaped channel which open radially inwardly and is configured to receive and engage a respective bayonet receptacle of a filter housing of a filter, each bayonet protrusion projecting radially outwardly from a radially outer circumference of the first end disk, the U-shaped channel of the bayonet protrusion delimited by:
a first leg of the U-shaped channel having a first end connected to the radially outer circumference of the first end disk and projecting radially outwardly from the radially outer circumference to a second end;
a base leg of the U-shaped channel connected to the second end of the first leg, the base leg projecting axially outwardly away from the first leg and the filter medium to an axially outer end of the base leg;
a second leg connected to the axially outer end of the base leg, the second leg projecting radially inwardly from the base leg in a direction towards the filter element longitudinal axis, the second leg spaced axially outwardly away from the first leg; and
a stop edge arranged at and closing off a circumferential end of the U-shaped channel, the stop edge forming a rotational stop against which the respective bayonet receptacle contacts when the respective bayonet receptacle engages the U-shaped channel of the bayonet protrusion, the stop end extends axially on a radially inner side of the base leg between the first leg and the second leg.

2. The filter element according to claim 1, wherein the stop edge extends parallel to the filter element longitudinal axis.

3. The filter element according to claim 1, wherein the plurality of bayonet protrusions includes a first bayonet protrusion and a second bayonet protrusion;
wherein the second bayonet protrusion, relative to the filter element longitudinal axis, is embodied with axial symmetry across the first end disk relative to the first bayonet protrusion.

4. The filter element according to claim 1, further comprising a second end disk, wherein the filter medium is arranged between and connected to the first end disk and the second end disk, wherein the second end disk forms an annular axially projecting wall on an axially outer side of the second end disk, the annular axially projecting wall positioned at a radially outer circumference of the second end disk, the annular axially projecting wall projecting axially outwardly away from the filter medium, and wherein the second end disk comprises at least one stay projecting axially outwardly from the axially outer side of the second end disk in a direction parallel to the filter element longitudinal axis, the at least one stay surrounded by the annular axially projecting wall.

5. A filter comprising:

a filter housing comprising a plurality of bayonet receptacles a filter element according to claim 1 arranged in the filter housing.

6. The filter according to claim 5, further comprising a central column extending in the direction of the filter element longitudinal axis in an interior of the filter medium, the central column having a bayonet connection member arranged over an axially outer side of the first end disk and extending radially outwardly from the central column, wherein a radially outer portion of the bayonet connection member forms the plurality of bayonet receptacles, which individually engage into a respective one of the plurality of bayonet protrusions of the filter element, forming a bayonet connection.

7. The filter according to claim 6, further comprising a heating element arranged on the central column.

8. The filter according to claim 6, further comprising a water level electrode arranged on the central column.

9. The filter according to claim 5, wherein the filter element further comprises a second end disk, wherein the filter medium is arranged between and connected to the first end disk and the second end disk, wherein the second end disk forms an annular axially projecting wall on an axially outer side of the second end disk, the annular axially projecting wall positioned at a radially outer circumference of the second end disk, the annular axially projecting wall projecting axially outwardly away from the filter medium, and wherein the second end disk comprises at least one stay projecting axially outwardly from the axially outer side of the second end disk in a direction parallel to the filter element longitudinal axis, the at least one stay surrounded by the annular axially projecting wall, wherein the stay is supported on a projection of the filter housing.

\* \* \* \* \*